US005788503A

United States Patent [19]

Shapiro et al.

[11] Patent Number: 5,788,503

[45] Date of Patent: Aug. 4, 1998

[54] EDUCATIONAL DEVICE FOR LEARNING TO READ AND PRONOUNCE

[75] Inventors: Ellen Shapiro, Irvington; Frederick C. Schlauch, Central Islip, both of N.Y.

[73] Assignee: Alphagram Learning Materials Inc., New York, N.Y.

[21] Appl. No.: 607,580

[22] Filed: Feb. 27, 1996

[51] Int. Cl.$^6$ .................. G09B 17/00

[52] U.S. Cl. .................. 434/172; 434/167; 434/178

[58] Field of Search .................. 434/430, 172, 434/170, 178, 167

[56] References Cited

U.S. PATENT DOCUMENTS

| | | | |
|---|---|---|---|
| 577,886 | 3/1897 | Snyder | 434/172 |
| 742,498 | 10/1903 | Roy . | |
| 912,547 | 2/1909 | Edwards . | |
| 1,010,782 | 12/1911 | Monteith | 434/178 |
| 1,012,574 | 12/1911 | Adams . | |
| 1,076,307 | 10/1913 | Nicholson . | |
| 1,107,417 | 8/1914 | Ford . | |
| 1,188,204 | 6/1916 | Pitt . | |
| 1,191,419 | 7/1916 | Harrison . | |
| 1,312,278 | 8/1919 | Shinn . | |
| 1,332,249 | 3/1920 | Feero . | |
| 1,377,327 | 5/1921 | Ebert . | |
| 1,405,134 | 1/1922 | Hayme | 434/178 |
| 1,485,146 | 2/1924 | Mundell . | |
| 1,538,530 | 5/1925 | Troipz | 434/176 |
| 1,540,085 | 2/1925 | Partridge . | |
| 1,542,819 | 6/1925 | Bloom . | |
| 2,042,930 | 2/1936 | Emmerich . | |
| 2,415,342 | 2/1947 | Donner . | |
| 2,510,884 | 6/1950 | Greene . | |
| 2,524,143 | 10/1950 | Smith | 434/178 |
| 2,628,435 | 2/1953 | Minninger et al. | 434/167 |
| 2,783,998 | 3/1957 | Collins . | |
| 2,901,839 | 9/1959 | Huff . | |
| 3,028,178 | 4/1962 | Pietrangeli et al. | 434/178 |
| 3,210,865 | 10/1965 | Muntz | 434/172 |
| 3,245,687 | 4/1966 | Irwin | 434/172 |
| 3,629,960 | 12/1971 | Roush | 434/430 |
| 3,654,712 | 4/1972 | Bagdasar . | |
| 3,657,458 | 4/1972 | Kuna | 434/430 |
| 3,728,800 | 4/1973 | Magram . | |
| 3,871,115 | 3/1975 | Glass et al. | 434/157 |
| 3,903,617 | 9/1975 | Evans . | |
| 3,968,573 | 7/1976 | Poliniere | 434/430 |
| 4,026,558 | 5/1977 | Patin . | |

(List continued on next page.)

OTHER PUBLICATIONS

"Muppet Brighter Child Phonics" American Publication Education, 1993.

Ready, Set, Go Picture-Letter Cards", Nancy Hall, Educators Publishing Service, Inc. Cambridge, MA 02138, 1991.

"Phoneme Cards", Lead Educational Resources, Inc. Bridgewater, CT 06752.

Learning Fasten-Ations, Brooklyn, NY 11204.

*Primary Examiner*—Paul J. Hirsch
*Attorney, Agent, or Firm*—Alfred M. Walker

[57] ABSTRACT

An educational device, such as a book, is designed to help children learn to read using building blocks of the English language, such as "tri-gram", composed of a consonant, followed by a vowel, followed further by another consonant. The book has a plurality of pages, wherein each page includes a plurality of partial page portions, preferably three, which can be independently turned from either of the other two partial page portions. The partial page portions are separated from each other by incisions, so that the partial page portions can be turned independently from the other two partial page portions. Each partial page portion includes a turnable picture and letter card with a consonant on the left-hand partial page portion, a vowel on the middle page portion, and a second consonant on the right-hand side page portion. Therefore, a child can make many pronouncable syllable words, such as "cat," "pet," "run," etc. with a selected array of the partial page portions. In addition, partial page portions, consisting of single and double-letters, are part of separate pads that can be arranged on a stand to allow the child to make words of increasing complexity.

2 Claims, 19 Drawing Sheets

30 10 22 20 41

32 72A 30 10 62A 32 32 71A 73A 61A bird apple girl 63A 51A b a g 53A 43A 41A 42A 52A

U.S. PATENT DOCUMENTS 4,176,473 12/1979 Rae ........ 434/178
4,192,513 3/1980 Feeley et al. .
4,204,343 5/1980 Brooks ........ 434/172
4,333,656 6/1982 Sommer .
4,345,902 8/1982 Hengel ........ 434/170
4,369,976 1/1983 Chunn .
4,402,513 9/1983 Head .
4,428,582 1/1984 Smith .
4,443,199 4/1984 Sakal ........ 434/170
4,515,566 5/1985 Sprague ........ 434/172
4,661,074 4/1987 Walker ........ 434/178
4,674,983 6/1987 Dorsz .
4,690,410 9/1987 Berton .
4,773,651 9/1988 Papapavlou .
4,775,157 10/1988 Armstrong .
4,826,175 5/1989 Quatrino .
4,877,255 10/1989 von Braunhut .
4,878,844 11/1989 Gasper et al. ........ 434/178
4,923,199 5/1990 Hahn .
4,950,165 8/1990 Machaalani .
5,013,245 5/1991 Benedict .
5,014,996 5/1991 von Braunhut .
5,033,964 7/1991 Phelps ........ 434/178
5,080,590 1/1992 Frisque .
5,092,777 3/1992 Crowe .
5,161,976 11/1992 Crowe .
5,188,533 2/1993 Wood .
5,199,714 4/1993 Harper .
5,203,706 4/1993 Zamir .
5,306,153 4/1994 Foster ........ 434/172
5,417,432 5/1995 Dwyer .

| a | a (long a) | ai | ar | e | ea | ee |
|---|---|---|---|---|---|---|
| shhh silent e | er | i | i (long i) | ir | o | (long o) |
| oo | or | u | u (long u) | ur | | |

FIG. 21

| a | b | c | d | e | f | g |
|---|---|---|---|---|---|---|
| h | i | j | k | l | m | n |
| o | p | r | s | t | u | v |
| w | x | y | z | | | |

FIG. 22

| bl | br | ch | cl | cr | dr | fl |
| --- | --- | --- | --- | --- | --- | --- |
| fr | g (soft) | gl | gr | pl | pr | qu |
| sc | sh | sk | sl | sn | sp | st |
| sw | th | tr | wh | | | |

FIG. 23

EDUCATIONAL DEVICE FOR LEARNING TO READ AND PRONOUNCE

FIELD OF THE INVENTION

This invention relates generally to teaching and learning devices and more particularly to devices aiding learners in the reading and pronouncing of letters and words.

BACKGROUND ART

Various instructional aids are known to assist children in learning to recognize and to pronounce letters and to read. Many of the devices include lettered blocks, wherein letters are provided on all sides of each of a plurality of blocks, so that a child can create different words with the blocks. An example is a common set of flashcards, wherein each flashcard contains letters or other verbal or pictorial indicia.

Among the background art for flash cards include U.S. Pat. No. D56,985 of Moore for a set of alphabet cards and U.S. Pat. No. D622,240 of Latham for a card game. In addition, flash cards are disclosed in a set of flash cards entitled "Muppet Brighter Child Phonics" of American Educational Publishing, copyright 1993, as well as "Ready, Set, Go Picture Letter Cards", by Nancy Hall, published by Educators Publishing Service, Inc., Cambridge, Mass. 02138, copyright 1991. Furthermore, Lead Educational Resources, Inc. of Bridgewater, Conn. 06752 publishes a set of flash cards entitled "Phoneme Cards", 1995 and Learning Fasten-ations of Brooklyn, N.Y. 11204 publishes "Boardmates", a set of alphabet cards attached by hook and loop VELCRO® to a board.

However, because of the random selection of blocks and letters in flash card sets and other related alphabet cards, the child is given no guidance on forming specific syllables or words to recognize and therefore begin the skill of reading. Other devices include puzzles which include puzzle pieces with letters on the puzzle pieces to form words within the confines of the puzzle. Among the prior art devices include:

Donner (U.S. Pat. No. 2,415,342) teaches a linear puzzle for learning reading and arithmetic.

Greene (U.S. Pat. No. 2,510,884) teaches fit together spelling and picture blocks.

Magram (U.S. Pat. No. 3,728,800) teaches interlocking educational blocks, wherein each block has a word which forms a part of a sentence.

Evans (U.S. Pat. No. 3,903,617) teaches an educational puzzle with individual pieces having letters thereon.

Dorsz (U.S. Pat. No. 4,674,983) teaches a teaching aid with a plurality of slidable, linearly extending rules, which are slidable against each other to teach scientific concepts.

Berton (U.S. Pat. No. 4,690,410) teaches a word forming tile puzzle game wherein each tile puzzle piece has a letter thereon.

Machaalani (U.S. Pat. No. 4,950,165) teaches educational toy blocks.

Benedict (U.S. Pat. No. 5,013,245) teaches information shapes with interrelated solid informational colored shapes.

Frisque (U.S. Pat. No. 5,080,590) teaches a learning aid book with a plurality of transparent and opaque pages and images which are pressure sensitive.

Wood (U.S. Pat. No. 5,188,533) teaches a speech synthesizing indicia for interactive learning which reproduces sounds of letters.

Zamir (U.S. Pat. No. 5,203,706) teaches an educational device with letter blocks.

However, none of the prior art patents describe a book with partial page portions, wherein each partial page portion includes a consonant, vowel, and consonant (and/or double-consonant and double-vowel) for use in creating syllables and words by forming selected arrays of letters on a plurality of adjacent partial page portions.

OBJECTS OF THE INVENTION

It is therefore an object of the present invention to provide an educational device to help children learn to recognize and pronounce letters and to read simple syllables and words of increasing complexity.

It is also an object of the present invention to assist children to read by using building blocks of the English language, such as "tri-grams" composed of a consonant, followed by a vowel, followed further by another consonant.

It is yet another object to provide an educational book which has a plurality of pages, wherein each page includes a plurality of partial page portions, each of which can be independently turned from either of the other partial page portions.

It is still another object to provide partial page portions and/or pads of partial page portions which can be combined in any order, for example two consonants and a vowel.

It is yet another object to provide an educational book wherein a child can make letter combinations and words by manipulating an array of the partial page portions.

It is another object to provide a means by which a teacher can select partial page portions consisting essentially of common double-letter combinations which can be used together or with single-letter cards to form more complex words.

It is yet another object to provide improvements over the disadvantages of the prior art.

SUMMARY OF THE INVENTION

In keeping with these objects and others which may become apparent, the present invention includes an educational device, known in the trade by Applicant's mark ALPHAGRAM™, which is designed to help children learn to read using building blocks of the English language, such as "tri-grams" composed of a consonant, followed by a vowel, followed further by another consonant.

The educational learning device includes a book having a plurality of pages, wherein each page includes a plurality of partial page portions, which can be independently turned from either of the other partial page portions.

The partial page portions are separated from each other by incisions, so that the partial page portions can be turned independently from the other partial page portions.

In the basic embodiment, the pages are bound by a spiral binding or rings so that the partial page portions can be turned by rotating about the binding.

In the basic embodiment, each partial page portion comprises a turnable letter card with a consonant on the left-hand partial page portion, a vowel on the middle page portion and a second consonant on the right-hand side page portion. Therefore, a child can make three-letter words, such as "cat," "pet," "run," etc.

By selectively choosing the desired and appropriate partial page portions, the child can create a large number of multi-letter words with the present invention. All of the trigrams formed by any combination of partial page portions in the basic embodiment form a pronouncable syllable.

The child can also play a game such as Applicant's game "IS IT A WORD OR NOT?"™, wherein the child learns whether a combination of displayed letters is a real word or not.

In addition, individual packs of cards comprising consonants, vowels, and double-consonant amd double-vowel blends such as th, ch, gr, ai or oo can be arranged on an easel-type stand to form four, five or six letter words such as "fast", "gleam", "growth" etc.

Additionally, the present invention may also include electronic embodiments in which various letter combinations and image indicia are displayed and the letters thereof may be changed and/or manipulated in their order and appearance electronically.

GLOSSARY

ACTUAL TARGET WORD: a word that is formed by combining the sequence of key letters visible to a learner and that is an actual word (for example, "cod" or "pod").

BIGRAM: a word or syllable formed by a combination of two letters, such as a combination of a vowel and a consonant.

BINDING: a binding (such as a spiral binding) to which the leaves of the present invention are movably attached.

IMAGE INDICIUM: an image of an object printed on a leaf that acts as a visual cue to help the learner remember the sound of the key letter or letters on the leaf. For example, the letter "f" is indicated by a picture of a fish. This can be a black and white line drawing, a color illustration, a color photograph, etc.

KEY LETTER INDICIUM: the letter or letters on a visible single-leaf surface used, in combination with the key letters of the other visible leaf surfaces, to form the target word; a relatively large typeset letter imprinted on a leaf.

LEAF: a page bearing one or more key letters or other indicia.

LEAVES: pages bearing at least one key letter indicium each.

LEARNER: a person (most likely a child) using the device of the present invention to learn.

NONSENSICAL TARGET WORD: a pronounceable sound that is formed by combining the sequence of key letters visible to a learner and that is nonsensical (for example, "kod" or "bap").

PAD OF LEAVES: a group of leaves forming a pad.

POLYGRAM: a word or syllable formed by a plurality of letters (for example, a bigram or a trigram is a polygram)

TARGET WORD: a word, either actual or nonsensical, that is formed by combining the sequence of key letters visible to a learner.

TRIGRAM: a word or syllable formed by a combination of three letters, such as a consonant, followed by a vowel, followed by a consonant.

VISIBLE LEAF: the leaf of a pad with its indicium or indicia positioned so as to be visible to a learner.

VISIBLE SET OF LEAVES: a group of leaves positioned within the device of the present invention so as to form an target word visible to a learner.

WORD INDICIUM: a word referring to the image indicium of the object printed on a leaf so as to aid a learner in the pronunciation of the key letter or letters on the leaf.

LIST OF REFERENCE NUMERALS

10: a multi-pad educational device for learning to read and/or pronounce.

20: a front cover.

22: a back cover.

25: cover indicia.

30: spiral binding.

32: holes allowing passage of spiral binding 30 through front cover 20, back cover 22, and leaves 41, 42 and 43.

41: leaves comprising pad 81.

42: leaves comprising pad 82.

43: leaves comprising pad 83.

41A: a leaf which is a part of pad 81.

41B: a leaf which is a part of pad 81.

42A: a leaf which is a part of pad 82.

43A: a leaf which is a part of pad 83.

43B: a leaf which is a part of pad 83.

51A: a key letter imprinted on leaf 41A.

51B: a key letter imprinted on leaf 41B.

52A: a key letter imprinted on leaf 42A.

53A: a key letter imprinted on leaf 43A.

53B: a key letter imprinted on leaf 43B.

61A: a word indicium imprinted on leaf 41A.

61B: a word indicium imprinted on leaf 41B.

62A: a word indicium imprinted on leaf 42A.

63A: a word indicium imprinted on leaf 43A.

63B: a word indicium imprinted on leaf 43B.

71A: an image indicium imprinted on leaf 41A.

71B: an image indicium imprinted on leaf 41B.

72A: an image indicium imprinted on leaf 42A.

73A: an image indicium imprinted on leaf 43A.

73B: an image indicium imprinted on leaf 43B.

81: a pad comprised of leaves 41.

82: a pad comprised of leaves 42.

83: a pad comprised of leaves 43.

130: spiral bindings.

132: holes allowing passage of spiral bindings 130.

141: leaves comprising pad 181.

141A: a leaf which is a part of pad 181.

141B: a tab of pad 181, which is removably insertable into a pocket of board 196.

142: leaves comprising pad 182.

142A: a leaf which is a part of pad 182.

142B: a tab of pad 182, which is removably insertable into a pocket of board 196.

143: leaves comprising pad 183.

143A: a leaf which is a part of pad 183.

143B: a tab of pad 183, which is removably insertable into a pocket of board 196.

151A: a key letter imprinted on leaf 141A.

152A: a key letter imprinted on leaf 142A.

153A: a key letter imprinted on leaf 143A.

161A: a word indicium imprinted on leaf 141A.

162A: a word indicium imprinted on leaf 142A.

163A: a word indicium imprinted on leaf 143A.

171A: an image indicium imprinted on leaf 141A.

172A: an image indicium imprinted on leaf 142A.

173A: an image indicium imprinted on leaf 143A.

191A: a color-coded region of leaf 141A.

192A: a color-coded region of leaf 142A.

193A: a color-coded region of leaf 143A.

194A: a pocket formed by attachment of pocket covering 195A to base board 195.

194B: a pocket formed by attachment of pocket covering 195B to base board 195.

194C: a pocket formed by attachment of pocket covering 195C to base board 195.

195A: a pocket covering peripherally attached to base board 195.

195B: a pocket covering peripherally attached to base board 195.

195C: a pocket covering peripherally attached to base board 195.

196: a pocket board for insertion of pads.

197: a multi-pad educational device for learning to read and/or pronounce.

181: a removable and insertable pad comprising leaves 141.

182: a removable and insertable pad comprising leaves 142.

183: a removable and insertable pad comprising leaves 143.

195: a base board.

230 or 230': loop bindings.

232 or 232': holes allowing passage of loop bindings 230.

241: leaves comprising pad 281.

241A: a leaf which is a part of pad 281.

242: leaves comprising pad 282.

242A: a leaf which is a part of pad 282.

243: leaves comprising pad 283.

243A: a leaf which is a part of pad 283.

244: leaves comprising pad 284.

244A: a leaf which is a part of pad 284.

252A or 252A': a key letter imprinted on leaf 241A.

254A: a key letter imprinted on leaf 243A.

261A or 261A': a word indicium imprinted on leaf 241A.

263A: a word indicium imprinted on leaf 243A.

271A or 271A': an image indicium imprinted on leaf 241A.

273A: an image indicium imprinted on leaf 243A.

281 or 281': a pad comprising leaves 241.

281A': top edge of pad 281

282 or 282': a pad comprising leaves 242.

283: a pad comprising leaves 243.

284: a pad comprising leaves 244.

291A or 291A': a pronunciation mark imprinted on leaf 242A.

292A: a pronunciation mark imprinted on leaf 244A.

295: a support stand.

297 or 297': a multi-pad educational device for learning to read and/or pronounce.

244B: a leaf which is a part of pad 284.

310: merchandise packaging of cards suitable for removable insertion into pockets of device 397.

311: group of cards within merchandise packaging 310.

312: merchandising display board mountable on merchandising display rack.

313: merchandising indicia.

314: transparent wrapping covering group of cards 311.

315: indicia indicating number assigned to group of cards 311.

325A: a card.

325B: a card.

325C: a card.

325D: a card.

330: spiral binding.

332: holes allowing passage of spiral binding 330.

341: leaves comprising pad 381.

341A: a leaf which is a part of 381.

342: leaves comprising pad 382.

342A: a leaf which is a part of pad 382.

343: leaves comprising pad 383.

343A: a leaf which is a part of pad 383.

344: leaves comprising pad 384.

344A: a leaf which is a part of pad 384.

351A: a key letter imprinted on card 325A.

352A: a key letter imprinted on card 325B.

353A: key letters imprinted on card 325C.

354A: key letters imprinted on card 325D.

361A: a word indicium imprinted on card 325A.

362A: a word indicium imprinted on card 325B.

363A: a word indicium imprinted on card 325C.

364A: a word indicium imprinted on card 325D.

371A: an image indicium imprinted on card 325A.

372A: an image indicium imprinted on card 325B.

373A: an image indicium imprinted on card 325C.

374A: an image indicium imprinted on card 325D.

381: a pad comprising leaves 341.

382: a pad comprising leaves 342.

383: a pad comprising leaves 343.

384: a pad comprising leaves 344.

390A: a color-coded region of card 325A.

390B: a color-coded region of card 325B.

390C: a color-coded region of card 325C.

390D: a color-coded region of card 325D.

394A: a pocket covered by transparent covering 398A.

394B: a pocket covered by transparent covering 398B.

394C: a pocket covered by transparent covering 398C.

394D: a pocket covered by transparent covering 398D.

397: a multi-pad educational device for learning to read and/or pronounce.

398A: a transparent covering peripherally attached to leaf 341A.

398B: a transparent covering peripherally attached to leaf 342A.

398C: a transparent covering peripherally attached to leaf 343A.

398D: a transparent covering peripherally attached to leaf 344A.

425A: a card.

425B: a card.

425C: a card.

425D: a card.

446: backboard.

451A: a color-coded key letter imprinted on card 425A.

452A: a color-coded key letter imprinted on card 425B.

453A: a color-coded key letter imprinted on card 425C.

454A: a color-coded key letter imprinted on card 425D.

461A: a word indicium imprinted on card 425A.

462A: a word indicium imprinted on card 425B.

463A: a word indicium imprinted on card 425C.

464A: a word indicium imprinted on card 425D.

471A: an image indicium imprinted on card 425A.

472A: an image indicium imprinted on card 425B.

473A: an image indicium imprinted on card 425C.

474A: an image indicium imprinted on card 425D.

494A: a pocket covered by transparent covering 498A.

494B: a pocket covered by transparent covering 498B.

494C: a pocket covered by transparent covering 498C.

494D: a pocket covered by transparent covering 498D.

495: a support stand on which educational device 497 is situated.

497: an educational device for learning to read and/or pronounce.

498A: a transparent covering peripherally attached to backboard 446.

498B: a transparent covering peripherally attached to backboard 446.

498C: a transparent covering peripherally attached to backboard 446.

498D: a transparent covering peripherally attached to backboard 446.

520: an instructional leaf larger than any single leaf comprised by underlying group of pads 580.

521: instructional indicia imprinted on leaf 520.

521A: instructional heading indicium.

521B: instructional text indicia.

521C: instructional illustration indicia.

530: spiral binding.

532: holes allowing passage of spiral binding 530.

580: group of leaf-comprised pads.

595: a support stand.

597: a multi-pad educational device for learning to read and/or pronounce.

BRIEF DESCRIPTION OF THE DRAWINGS

FIGS. 21, 22 and 23 show respective charts of sample sets of key vowels, key consonants and key 2-letter word beginnings respectively, with image indicia shown for each

DETAILED DESCRIPTION OF THE PREFERRED EMBODIMENT

Figure 1:
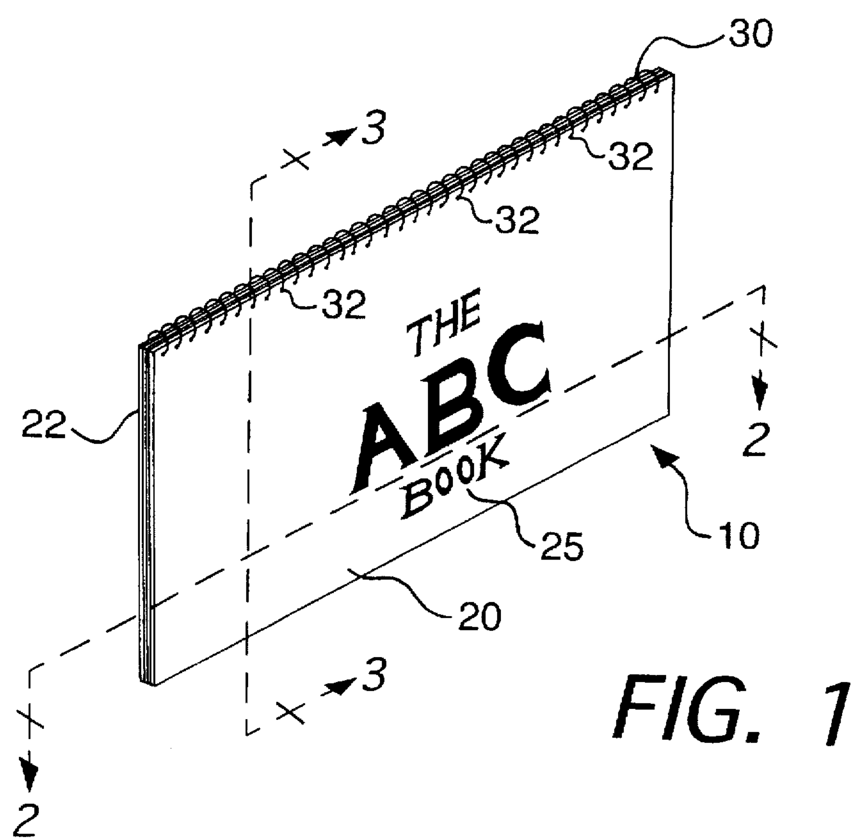
FIG. 1 is a perspective view of the preferred embodiment of the multi-pad educational device for learning to read and pronounce of the present invention.
Figure 2:
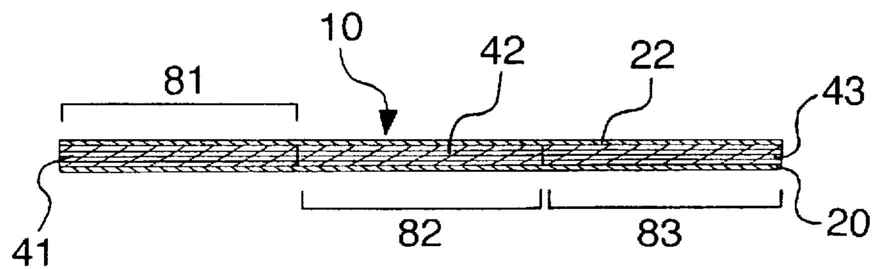
FIG. 2 is a lengthwise cross-section of the multi-pad educational device illustrated in FIG. 1, taken along line 2—2 in FIG. 1.
Figure 3:
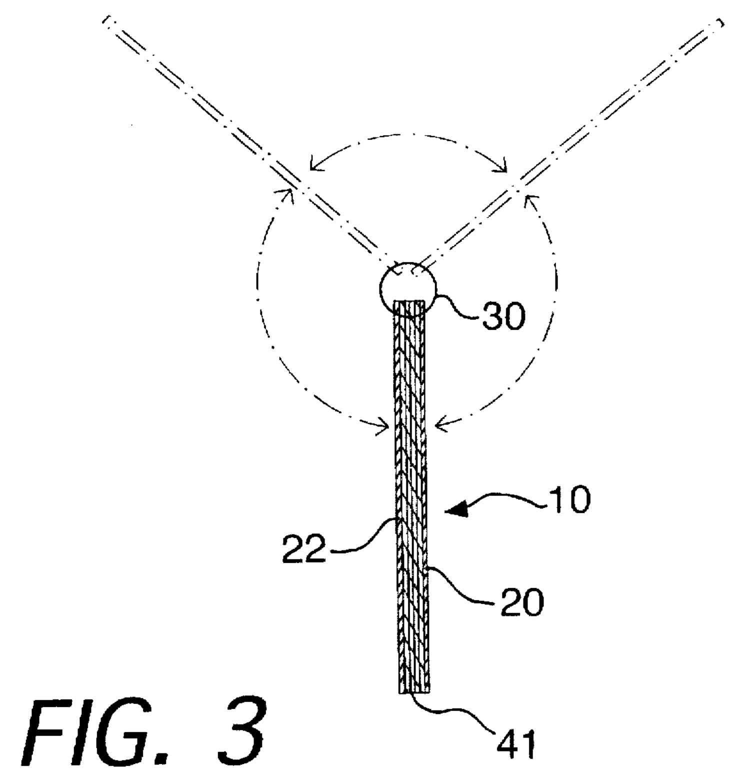
FIG. 3 is a widthwise partial cross-section of the multi-pad educational device illustrated in FIG. 1 and shows by the direction of the arrow therein how the covers and leaves of the device can be rotated into a desired position, taken along line 3—3 in FIG. 1.
Figure 4:
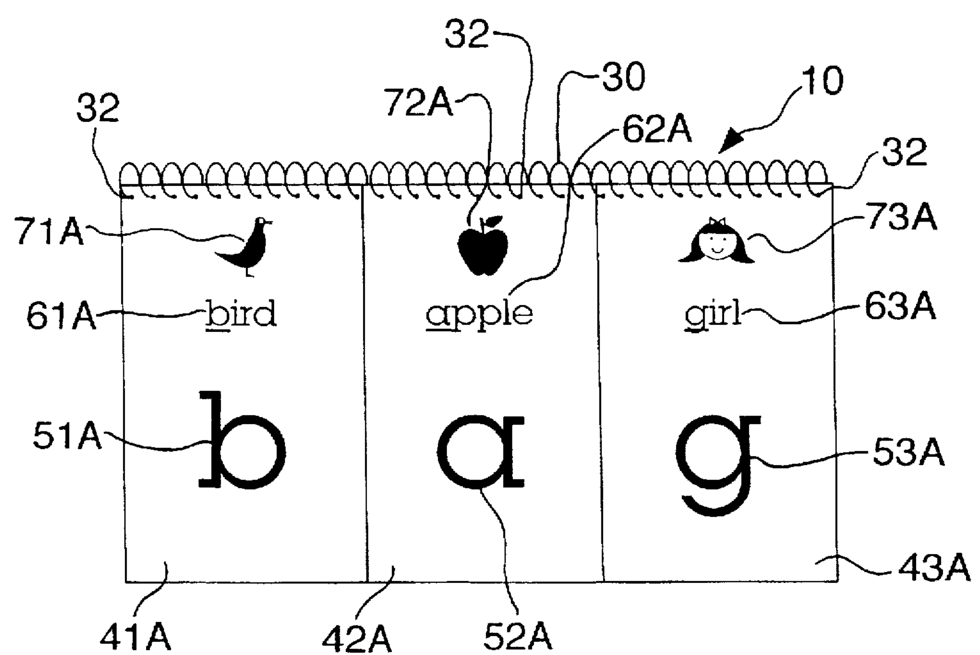
FIG. 4 is a front view of the multi-pad educational device illustrated in FIG. 1 and is shown in an opened position with three leaflets of pads 81, 82 and 83 visible to a learner.
Figure 5:
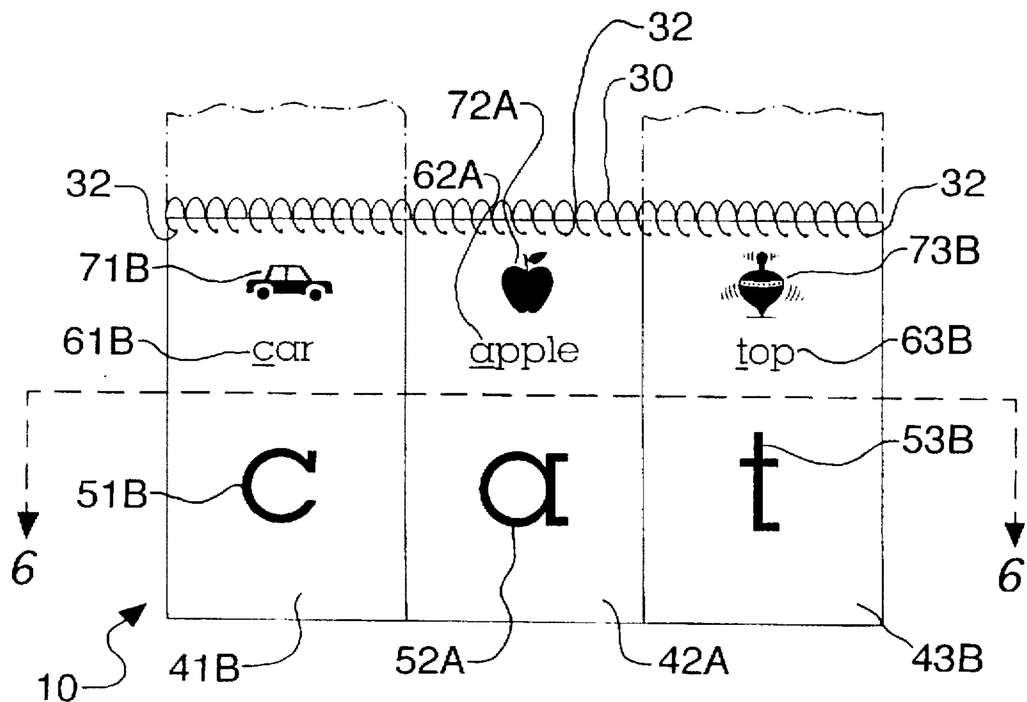
FIG. 5 is a front view of the multi-pad educational device illustrated in FIG. 1 and shows the leaves of pads 81 and 83 positioned differently from their positioning in FIG. 2.
Figure 6:
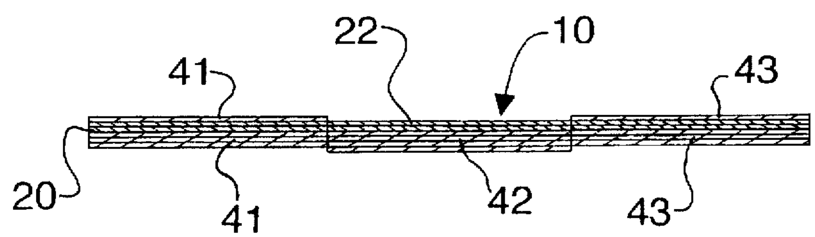
FIG. 6 is a lengthwise cross-section of the multi-pad educational device illustrated in FIG. 1 as positioned in FIG. 5, taken along line 6—6 in FIG. 5.
Figures 7, 8:
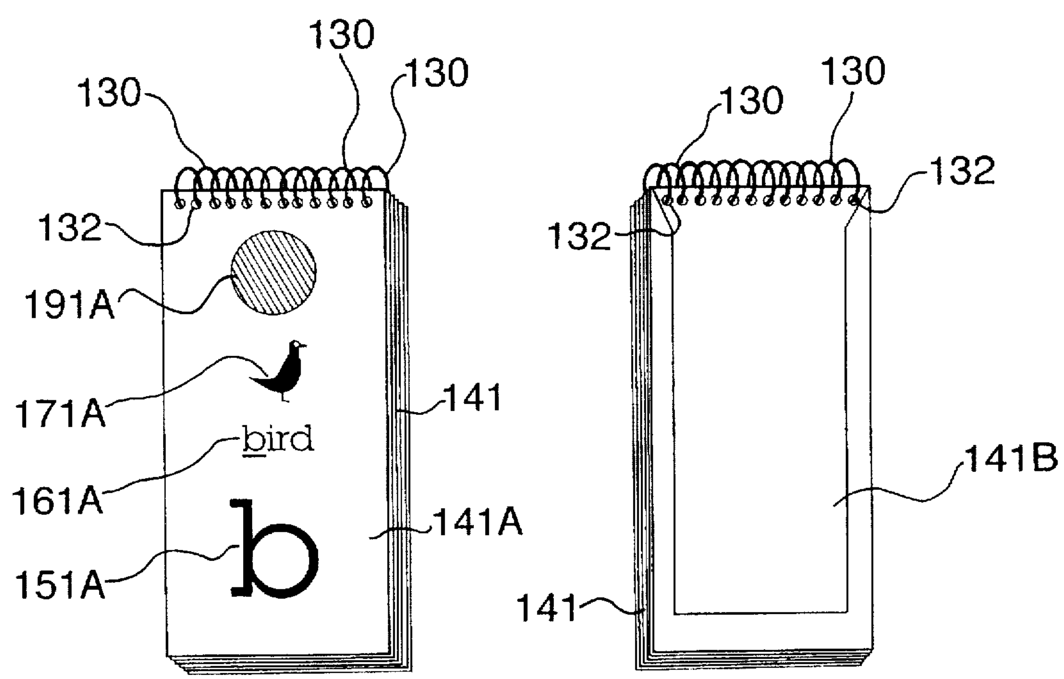
FIG. 7 is a front perspective view of a removable and insertable pad of another embodiment of the present invention.
FIG. 8 is a rear perspective view of a removable and insertable pad of another embodiment of the present invention as in FIG. 7.
Figure 9:
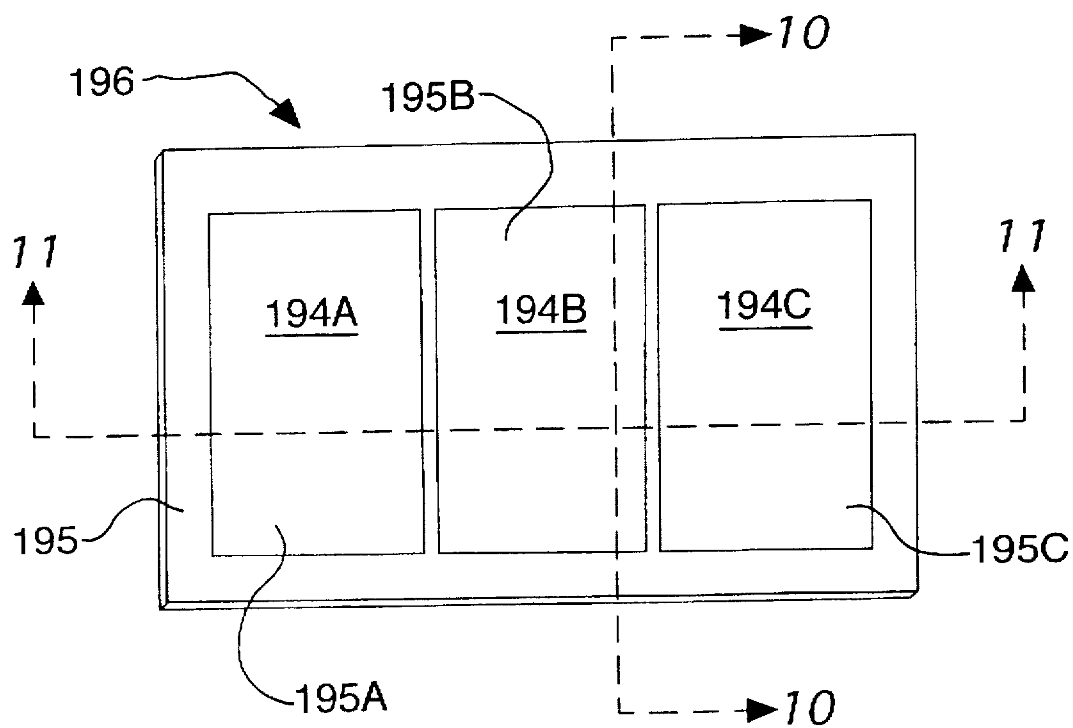
FIG. 9 is a pocketed board for insertion of the pads as in FIGS. 7 and 8.
Figure 10:
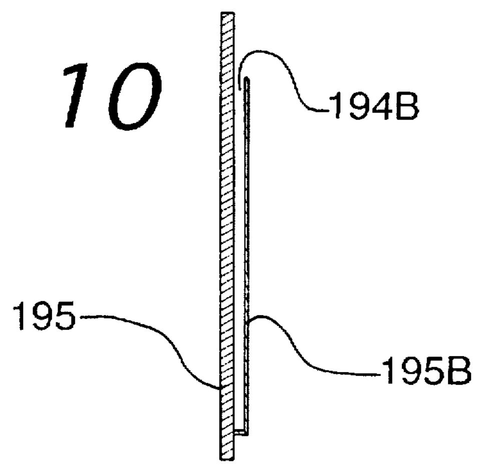
FIG. 10 is a side cross sectional view of the board as in FIG. 9, taken along line 10—10 of FIG. 9.
Figure 11:
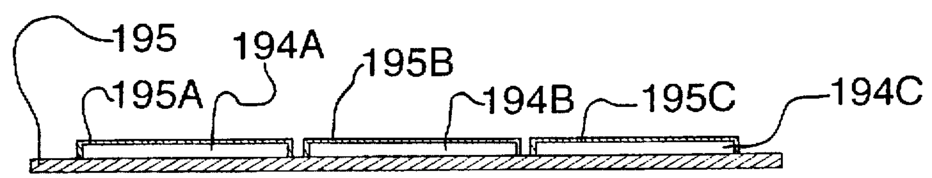
FIG. 11 is a top cross sectional view of the board as in FIG. 9, taken along line 11—11 of FIG. 9.

As shown in FIGS. 1–6, multi-pad educational device 10 includes a plurality of pads 81, 82, 83, etc. each of said plurality of pads 81, 82, 83 having a pluralities 41, 42, 43 of visible leaves 41A, 41B etc, 42A, 42B, etc. and 43A, 43B etc. respectively.

Leaves 41A, 41B, 42A, 42B, 43A, 43B each have a front surface and a back surface, wherein indicia means are provided thereon for aiding in the learning of reading by forming target words.

A target word may be an actual word such as "cat" or "hop", or a nonsense syllable such as "tat" or "dop", which may be part of one or more actual words (such as "habitat" or "adoption"). The correct recognition of this, and the correct pronunciation of this, aids in learning to read more complex words.

Preferably, an indicia may be an key letter such as an alphabet letter, such as consonant or a vowel, a word indicium, such as the word "bird", or an image indicium, such as a picture related to the word, such as picture of the word "bird".

Leaf 41A may have a key letter 51A or a word indicium 61A. Leaf 41B may have a key letter 51B or a word indicium 61B. Leaf 42A may have a key letter 52A or a word indicium 62A. Leaf 42B may have a key letter 52B or a word indicium 62B. Leaf 43A may have a key letter 53A or a word indicium 63A. Leaf 43B may have a key letter 53B or a word indicium 63B.

Likewise, leaf 41A may have an image indicium 71A imprinted thereon. Leaf 41B may have an image indicium 71B imprinted thereon. Leaf 42A may have an image indicium 72A imprinted thereon. Leaf 42B may have an image indicium 72B imprinted thereon. Leaf 43A may have an image indicium 73A imprinted thereon. Leaf 43B may have an image indicium 73B imprinted thereon.

Educational device 10 further includes a binding 30, such as a spiral or ring binding, which binding 30 joins each pad 81, 82, 83 of said plurality of pads 81, 82, 83 at or near a peripheral edge of said each pad 81, 82, 83. Binder 30 may be insertable within holes 32 within pads 81, 82 or 83 of multi-page educational device 10, so that each leaf 41A, 41B, 42A, 42B, 43A or 43B of pads 81, 82, 83 are movably attached to binder 30, and preferably rotatable around binder 30.

Each pad 81, 82, 83 has at least one edge situated substantially adjacent to and substantially parallel to at least one edge of another pad of said plurality of pads 81, 82, 83.

Binding 30 provides a means for rotating respective leaves 41A, 41B, etc., 42A, 42B etc., and 43A, 43B etc. of each pad 81, 82, 83 respectively, substantially independent from any rotational movement of another leaf of any other pad of said plurality of pads 81, 82, 83.

Each pad 81, 82 or 83 of said plurality of pads 81, 82, 83 are juxtapositioned in relation to each other pad 81, 82 or 83 of said plurality of pads 81, 82, 83 so as to allow a viewer to position and view at least one surface of at least one leaf 41A, 41B, 42A, 42B, 43A or 43B of each and every pad 81, 82 or 83 of said plurality of pads 81, 82, 83 in a substantially parallel viewing plane together.

The multi-pad educational device 10 preferably has at least three pads 81, 82, 83, wherein at least two of said plurality of pads 81, 82, 83 each includes at least fifteen leaves 41A, 41B etc, 42A, 42B, etc, or 43A, 43B etc.(for consonants). For vowels, "a", "e", "i", "o" "u", five leaves are provided, or six if "y" is added to the vowel pad.

The indicial means include a letter 51A, 51B, 52A, 52B, 53A or 53B imprinted on each front surface of each leaf 41A, 41B, 42A, 42B, 43A or 43B of each pad 81, 82 or 83 of said plurality of pads 81, 82, 83.

Each leaf 41A, 41B, 42A, 42B, 43A or 43B in one pad 81, 82 or 83 of the plurality of pads 81, 82, 83 is positionable for simultaneous viewing with letters 51A, 51B, 52A, 52B, 53A or 53B imprinted on at least two leaves 41A, 41B, 42A, 42B, 43A or 43B of at least two other pads 81, 82 or 83.

Letters 51A, 51B, 52A, 52B, 53A or 53B may be consonants or vowels, with preferably the outer left and right pads 81, 82, 83 only having consonants, such as all of the consonants of the English language and middle pad 82 only having vowels, such as vowels of the English language, so that tri-gram words of "consonant-vowel-consonant" can be formed and read, such as "hat", "cat", "bog", "hog", "set" or "met".

However, other combinations with more than three pads 81, 82, 83 are within the scope of the present invention.

Alternatively, the letter "y" may be on leaves 41A, 41B of pad 81 or leaves 43A, 43B of pad 83, wherein consonant-vowel-consonant trigrams are formed by various positionings of the leaves 41A, 41B, 42A, 42B, 43A, 43B etc. of the three pads 81, 82, 83.

The indicia means may include one relatively large typeset letter imprinted on each leaf 41A, 41B, 42A, 42B, 43A, 43B etc. of the three pads 81, 82, 83, which letter is different from any other relatively large typeset letter imprinted on any other sheet of the same single pad, and wherein the indicia means further include smaller typeset words, with a smaller typeset whole word per leaf, each smaller typeset whole word including use of a smaller version of the letter set in larger type on the same leaf.

Each leaf 41A, 41B, 42A, 42B, 43A, 43B etc. of each pad 81, 82 or 83 of said plurality of pads 81, 82, 83 may have pictorial images of objects defined by each smaller typeset word on each leaf.

The multi-pad educational device 10 may include front cover 20 and back cover 22, wherein front cover 20 has imprinted thereon cover indicial information 25 related to the educational nature of educational device 10. Front cover 20 and back cover 22 each substantially comprise one continuous body of substantially flat material extending approximately at least the length of binding 30.

Binder 30 allows a user, such a child learning to read, to flip through the leaves 41A, 41B of each pad 81 without being forced to move leaves 42A, 42B of an adjacent pad 82 or to move leaves 43A, 43B of pad 83.

Leaves 41A, 41B, 42A, 42B, 43A, 43B are capable of being positioned by a user to form, in combination with leaves of the other pads 81, 82 or 83 attached to substantially spiral binding 30, a sequence of leaves 41A, 41B, 42A, 42B, 43A, 43B at a substantially equal viewing plane, thereby bringing relatively large typeset letters 51A, 51B, 52A, 52B, 53A, 53B with one typeset letter per pad, into the viewing plane as a sequence of letters.

One middle pad 82 of three pads 81, 82, 83 is attached to substantially spiral binding 30 in a position substantially intermediate between the other outer two pads 81, 83, so that pad 82 is an intermediate pad, wherein the relatively large typeset letters 52A, 52B, etc. imprinted on the leaves 42A, 42B, etc. of intermediate pad 82 were selected from the group consisting of the letters "a", "e", "i", "o", and "u", and wherein each of the other two pads 81, 83 of said pads include leaves 41A, 41B, 43A, 43B, etc. having imprinted thereon approximately twenty different relatively large typeset letters 51A, 51B, 53A, 53B including consonants. In the preferred embodiment, the left-hand set of partial page portions only contains consonants that begin words in English (no x, etc.). The right-hand set only contains consonants that end 3-letter words in English (no c, h, g, etc.).

Moreover leaves 41A, 41B, 42A, 42B, 43A, 43B of pads 81, 82, 83 may include indicial information to aid in the pronunciation of consonant-vowel-consonant sounds.

Each image indicium 71A, 71B, 72A, 72B, 73A, 73B of a correlatable object imprinted on each leaf 41A,421B, 42A, 42B, 43A or 43B can aid in remembering the proper pronunciation of the relatively large typeset letter 51A, 51B, 52A, 52B, 53A or 53B imprinted on each leaf 41A, 41B, 42A, 42B, 43A or 43B.

Furthermore color-coding may aid in formation of words formed on leaves 41A, 41B, 42A, 42B, 43A or 43B. Color coding relates to left-to-right sequencing only. For example, the learner starts pronouncing on a green "initial consonant" side (wherein green means "go" or "start")and ends on a red "final consonant" (wherein red means "stop"). This embodiment is therefore primarily designed for dyslexics who have trouble with left-to-right sequencing.

It is noted that the words obtained may be nonsense words or actual words. The actual words may be combinations of letters including vowels and consonants.

The user selects letters 51A, 51B, 52A, 52B, 53A, 53B, etc. to form sequences of letters by alignment of leaves 41A, 41B, 42A, 42B, 43A, 43B having imprinted thereon relatively large typeset letters 51A, 51B, 52A, 52B, 53A, 53B, etc. Binder 30 allows a user to form sequences of relatively large typeset letters 51A, 51B, 52A, 52B, 53A, 53B, etc.in the form of combination of letters, such as vowels and consonants.

FIGS. 7–12 show an alternate embodiment for a multi-pad educational device 197 having removable and insertable pads 181, 183, 184 of leaves 141, 142, 143, which leaves have indicia thereon, such as key letters 151A, 152A, 153A, word indicia 161A, 162A, 163A associated with image indicia 171A, 172A, 173A, or optionally color coded regions 191A, 192A, 193A.

Figure 12:
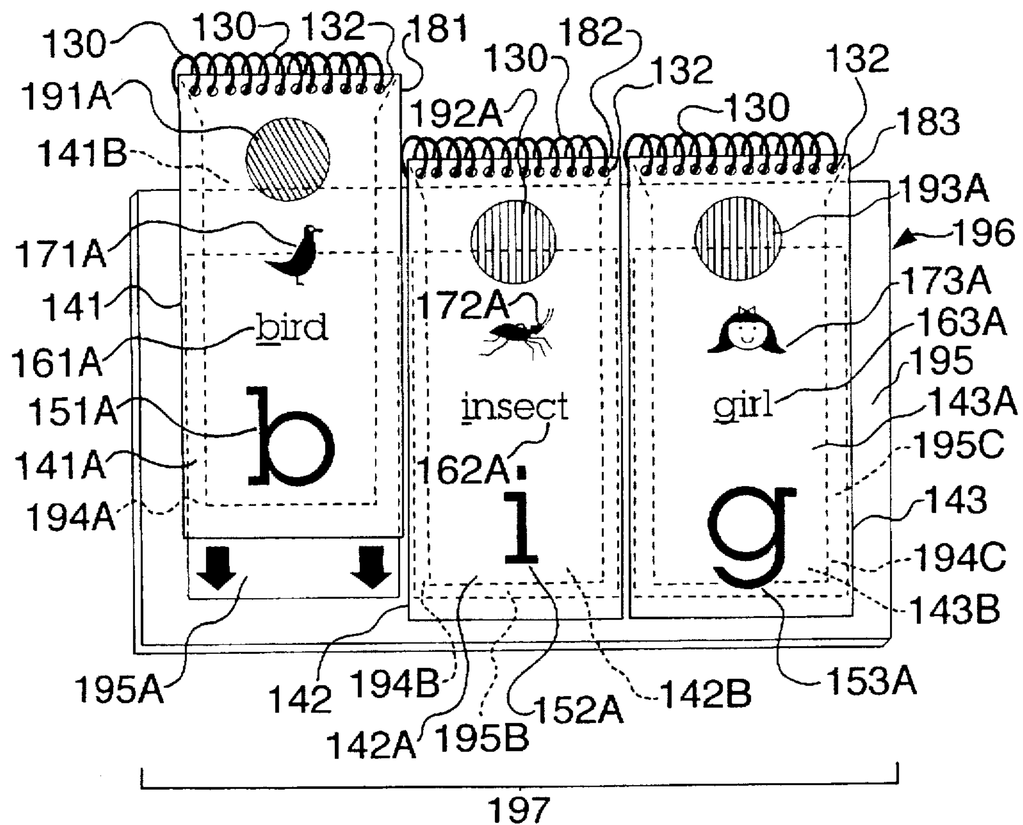
FIG. 12 is a front elevational view of the pads and board as in FIGS. 7–11, shown in use, wherein the arrow designates the direction of insertion of a pad within the board.

For example, FIG. 12 shows leaf 141 of pad 181 with key letter 151A for "b", and word indicium 161A for the word "bird" and image indicium 171A for a picture of a "bird" associated therewith indicating the sound "buh".

FIG. 12 also shows leaf 142 of pad 182 shows key letter 156A for "i", as well as word indicium 162A for "insect" and image indicium 172A for a picture of an "insect" and the sound "ih".

Moreover, FIG. 12 further shows leaf 143 of pad 183 shows key letter 153A for "g", together with word indicium 163A for the word "girl" and image indicium 173A with a picture of a "girl" and the sound "gh".

Therefore, the child learns to combine "buh", "ih" and "gh" to achieve the word b-i-g.

Pads 181, 183, 184 are bound by appropriate fastening means, such as for example spiral bindings 130 within holes 132 of the respective pads.

Tabs 141B, 142B, 143B of pads 181, 183, 184 are insertable within pockets 194A, 194B, 194C (formed by pocket coverings 195A, 195B, 195C) of base board 196.

Figure 13:
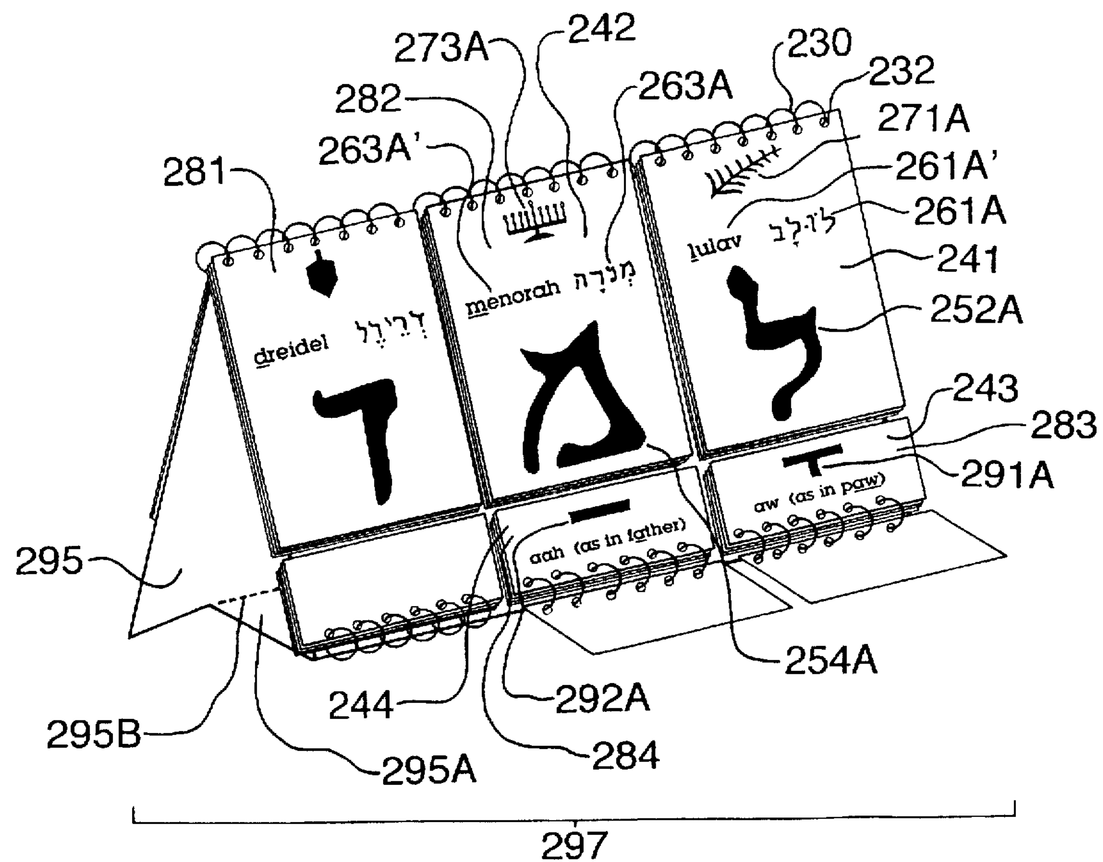
FIG. 13 is a perspective view of another embodiment for a plurality of pads which show letters and indicia on multiple cards, wherein one set of cards opens on top of another set which opens below the first, upper set of cards.

FIG. 13 shows an alternative embodiment for a multi-pad educational device 297 with stand 295 supporting sets of dual pads 281, 282, as well as dual pads 283, 284 which dual pads show letters and indicia on multiple leaves 241, 242 and 243, 244, wherein one set of leaves 281 or 283 opens on top of other set of leaves 282 or 284, which leaves 282 or 284 opens below the first, upper set of leaves 281 or 283.

FIG. 13 is especially useful for languages such as Hebrew with vowels underneath the consonants, such as marks 291A or 292A, which are Hebrew vowels.

In the example shown in FIG. 13, used to teach Hebrew to English speakers/readers, the word indicium 261A shows the word "lulav" in English and in Hebrew and the word indicium 263A shows the word "menorah" in English and in Hebrew, with image indium 271A for a picture of a lulav plant branch and image indicum 273A for a picture of a menorah associated with these two Hebrew characters (or consonants). Reference numerals 252A and 254A depict the Hebrew letters that name the English sound of "L" and "M" respectively. Reference numerals 291A and 292A denote vowels, which in Hebrew are underneath the consonants. The vowel partial page portions may be turned independently of the consonant partial page portions, aiding the learner in pronouncing a multiplicity of consonant-vowel combinations in Hebrew.

Just like in English the vowels in Hebrew can be used with any consonant. These vowels are not associated with lulav, menorah or anything else.

In FIG. 13 pads 281.282, 283 and 284 are held by appropriate fasteners, such as for example, binders 230 within holes 232.

Figure 14:
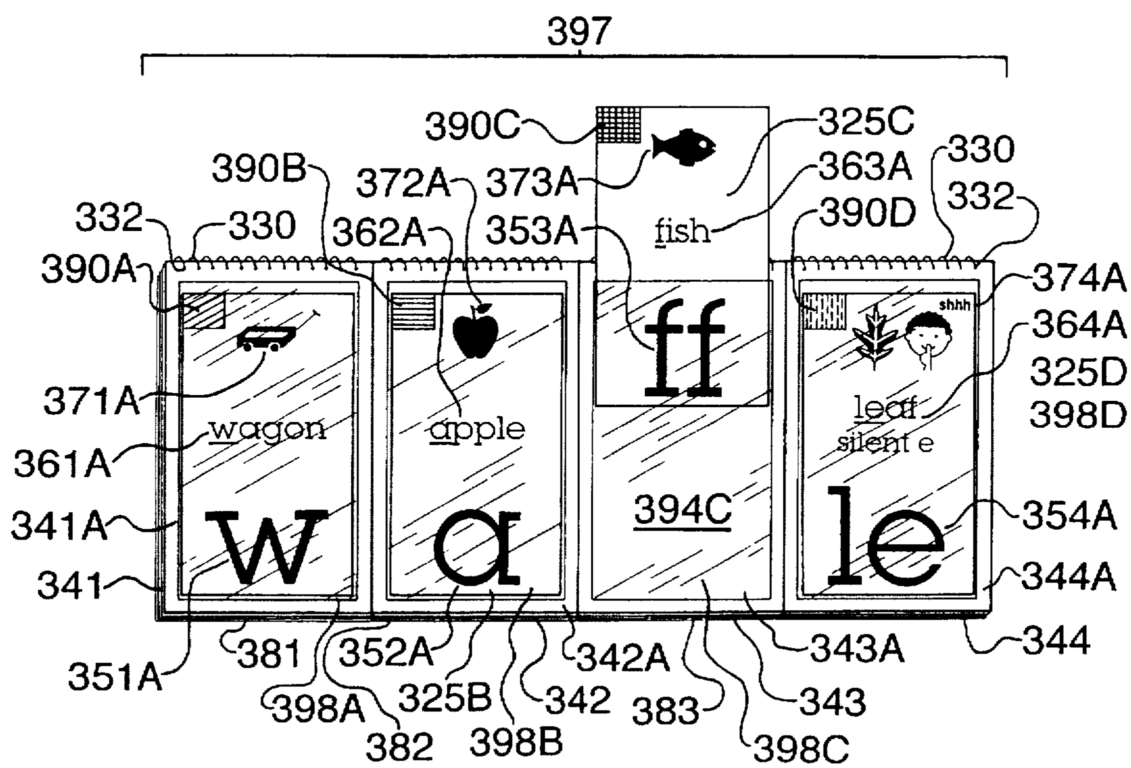
FIG. 14 is a front elevational view of a further embodiment of the present invention, wherein separate interchangeable cards are insertable within transparent viewing packets.
Figure 15:
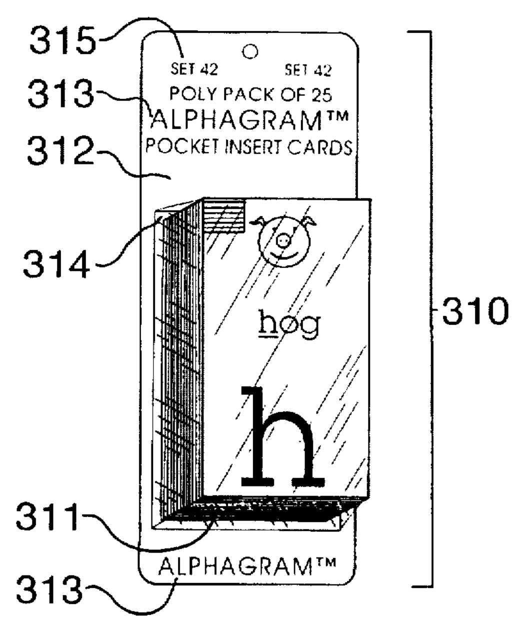
FIG. 15 is a front perspective view of a set of separate interchangeable cards as in FIG. 14, shown packaged together.

FIGS. 14–15 show a further embodiment for a multi-pad educational device with pads 381, 382, 383, 384, wherein each leaf 341, 342, 343 or 344 has transparent pockets 398A, 398B, 398C, 398D of respective pads 381, 382, 383, 384, so that separate interchangeable cards 325A, 325B, 325C, 325D of packet 310 may be insertable within pockets 398A, 398B, 398C, 398D.

FIG. 15 shows merchandising packet 310, which includes group 311 of cards with merchandising display board 312 having merchandising indicia 313 thereon, as well as transparent wrapping 314 covering cards 311 and indicia 315 indicating a number assigned to group 311 of cards.

Figure 16:
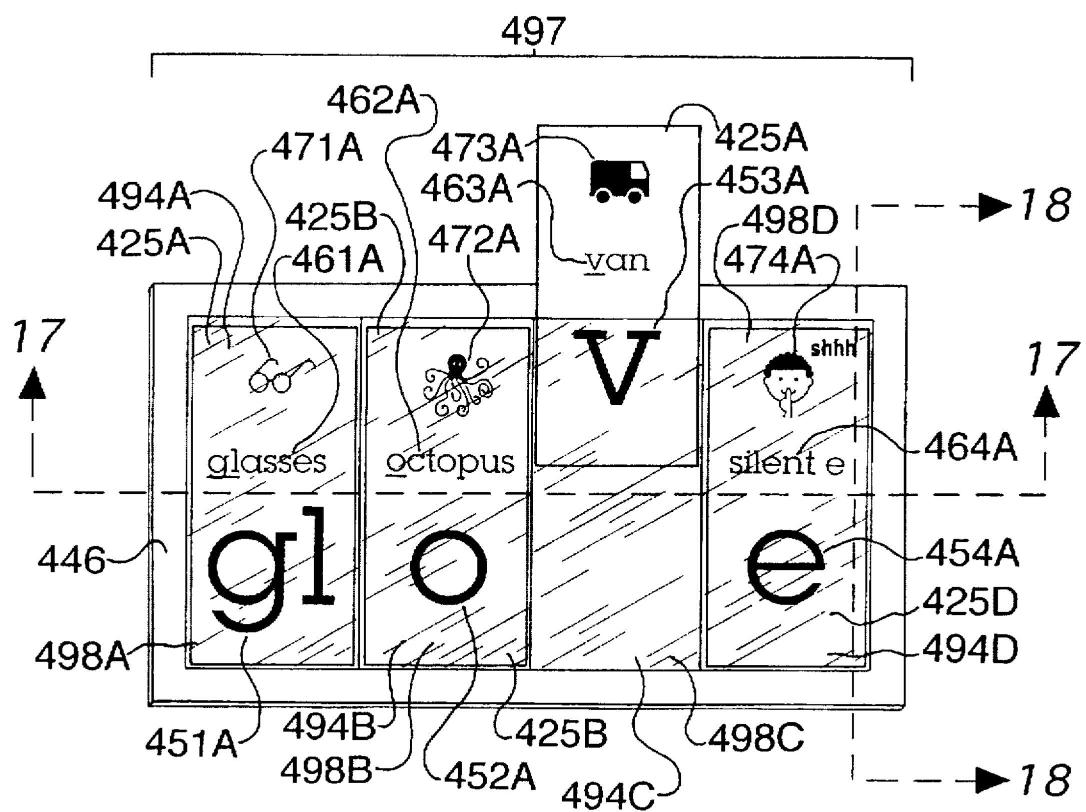
FIG. 16 is a still further embodiment of a board having a plurality of transparent pockets for insertion of interchangeable cards therein.
Figure 17:
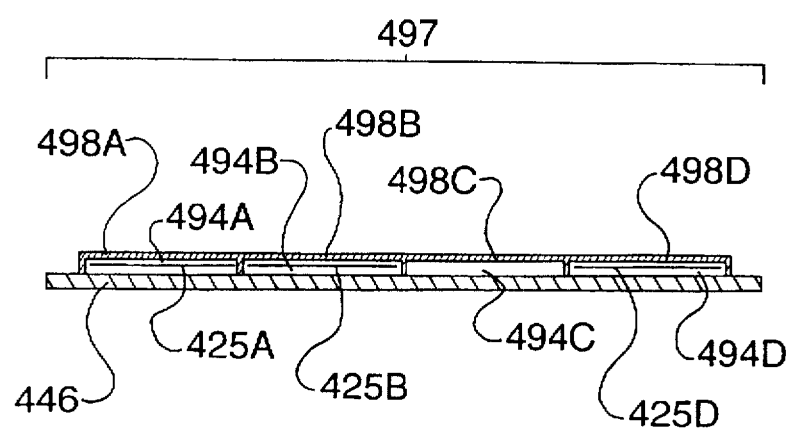
FIG. 17 is a top plan cross sectional view of the embodiment as in FIG. 16, taken along line 17—17 in FIG. 16.
Figure 18:
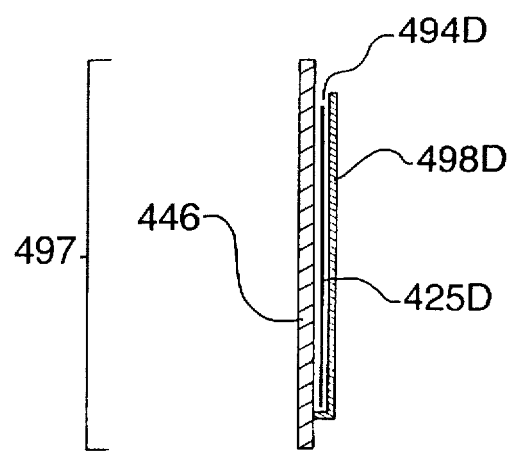
FIG. 18 is a side elevational cross sectional view of the embodiment as in FIGS. 16 and 17.

FIGS. 16–18 show yet another embodiment for educational device 497 with back board 446 having transparent pockets 494A, 494B, 494C and 494D for insertion of cards 425A, 425B, 425C and 425D therein. Base board 497 may also include support stand 495 to support base board 497 in an upright, freestanding position.

Figure 19:
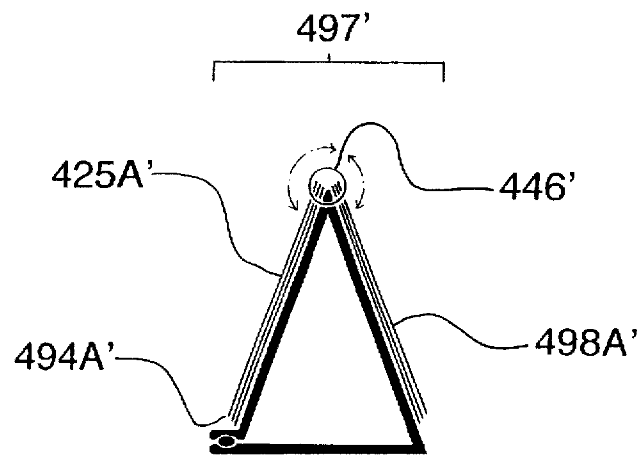
FIG. 19 is a side elevational view of a still further embodiment, wherein the display portion rotates about a binding from a front viewing part of a support base to a rear part of the support base.

FIG. 19 shows a side elevational view of a further embodiment for an educational device 497' with pad 425A' having leaves 494A' and rotated leaf 498A', which leaf 498A' rotates about fastener 446'. Up to five pads 425A' are supported on stand 495'.

Figure 19A:
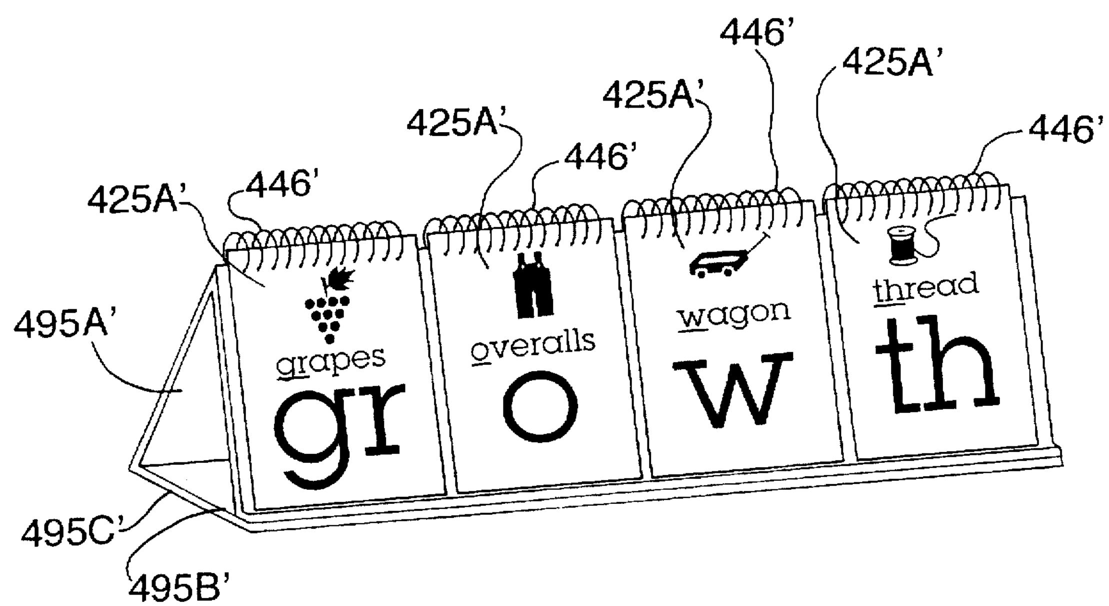
FIG. 19A is a perspective view of the embodiment as in FIG. 19, showing multiple display portions.

FIG. 19A shows multiple pads 425A' placed upon stand 495A'. Bottom brace 495B' is pleated by a crease at midline 495C', which crease folds up by the arrow indicating an upward direction, so that stand 495A' may be folded flat after use.

Figure 20:
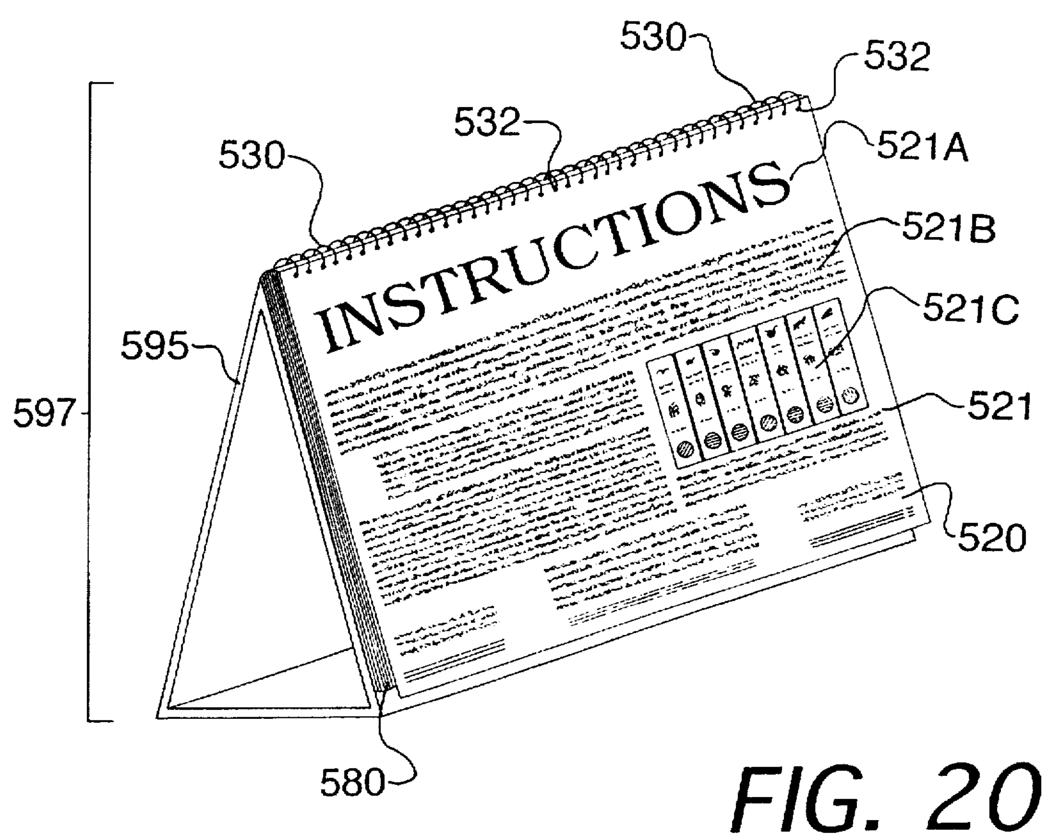
FIG. 20 is a perspective view of a stand for a further embodiment, showing an instructional cover page thereon.

FIG. 20 shows freestanding stand 595 for educational pad 597. Instructional cover sheets 520 covers pads 580 thereunder.

Unlike the basic embodiment shown in FIGS. 1–6 where a book structure is provided with separate rotatable partial page portions, in the embodiments shown in FIGS. 7–13, there is provided a plurality of pads with separate leaves. Each of these plurality of pads includes a plurality of leaves, and each of the leaves having a front surface and a back surface.

As also shown in FIGS. 7–13, to aid in the learning of reading and/or pronouncing of letters, and/or words, indicia are imprinted on leaves of the plurality of pads and/or are imprinted on removably insertable cards. The indicia may include letters, pictures, accent marks or color-coded markings indicating sequences of letters.

A binding joins each pad of the plurality of pads at or near a peripheral edge of each pad, wherein each pad has at least one edge situated and/or capable of being situated substantially parallel to at least one edge of another pad.

The binding provides a means for rotating a leaf of each pad substantially independent from any rotational movement of another leaf of another pad.

Each pad of the plurality of pads is juxtaposed or is capable of being juxtaposition in relation to another pad, so as to allow a viewer to view both indicia imprinted on a leaf of each pad and/or imprinted on a removably insertable card associated with a leaf of said pad. Indicia is imprinted on a leaf of another pad and/or is imprinted on a removably insertable card associated with a leaf of said another pad.

Each pad is capable of being manipulated by the viewer to provide a substantially parallel viewing plane encompassing both indicia imprinted on a leaf of each pad or imprinted on a removably insertable card associated with a leaf of each pad or removably insertable card.

A tab means allows removable insertion of each pad of into pockets of the multi-pad educational device.

In the embodiments shown in FIGS. 14–19, the educational device may optionally include transparent pocket structures for holding separate cards therein.

While FIGS. 1–6 show a book structure, FIGS. 13, 19 and 20 show various easel-type support stands. In addition, the bottom of the book structure 10 may have an optional folding fastener in the form of a pleated sheet, similar to foldable bottom brace 495B' shown in FIG. 19, wherein the folded pleated sheet expands flat to provide a bottom brace to form an easel-type structure out of book structure 10 itself.

Another embodiment is an easel-type board on which individual pads (such as for example, up to five pads) may be arranged.

The two pads each include a plurality of leaves and a male tab structure which is removably insertable into one female pocket structure of the two female structures. These two pads each include a binding substantially along or near a peripheral edge of each of the pads. The pads each have a plurality of leaves bearing indicia to assist in the learning of reading and/or pronunciation of letters and/or words and/or symbols. Furthermore, the pads are each removably insertable on the base board by insertion of the male tab structure of the pad into a slit of the female pocket structure of the base board.

For movement, each leaf is capable of movement substantially about an axis formed by the binding, wherein the binding allows a user to flip through the leaves of a pad without being forced to simultaneously move the leaves of an adjacently positioned pad. Therefore, each leaf is positioned by a user to form, in combination with leaves of another pad removably inserted on the base board, a sequence of leaves bearing indicia at a substantially equal viewing plane.

For replacement, the pads may be manufactured and packaged to supplement and/or replace any of the existing pads.

The letters on the leaves may be typeset, and also may include one relatively large typeset letter in a letter selected from various languages with different alphabets, such as the Hebrew, Japanese, Chinese or Russian alphabets. Also, the indicia may include letters and pronunciation marks for teaching the reading and/or pronunciation of letters and/or words in Hebrew, Japanese, Chinese or Russian characters.

For languages such as French, Italian, etc. the same alphabet is used. However, a difference would be that the picture of a dog, for example, used in the visual cue for "d" in English would become the "c" or "ch" for "chien" in French and the "p" for "perro" in Spanish, giving children the appropriate visual cue in each language.

The indicia may include letter indicia for bilingual aiding in the learning of reading and/or pronouncing of letters and/or words, including at least one letter from a first language and at least one letter from a second language, such as wherein the first language is English and the second language is Hebrew.

The indicia may include a word in the first language and a correlative word in the second language, wherein each card has an image indicium correlative with a meaning held by both the word in said first language and the word in the second language, and wherein the indicia can also include an accent mark or punctuation mark.

For example, as shown in FIG. 13, educational device 297' is supported on stand 295', with a single pad which has leaves 281' which rotate up and leaves 282' which rotate down. Word indicium 261A', such as "menorah" is associated with image indicium 271A, such as a picture of a menorah. Key letter 252A' may be in another language, such as Hebrew. Leaf 282' may have marks 291A' to denote vowels. Leaves 281' and 282' rotate about fasteners 230' in holes 232.

While the above description of the present invention contains many specificities, these should not be considered as limitations on the scope of the invention but rather as exemplifications of some of the embodiments thereof. Many other modifications and variations can be made without departing from the scope of the present invention, and all such modifications and variations are intended to be covered by the appended claims.

We claim:

1. The method of assembling and using a device for teaching the recognition and pronunciation of letters and words comprising the steps of:

constructing a book having a one piece front cover, a one piece back cover, and a binding along one edge of said covers to permit said book to be opened by rotation of said covers about said binding, mounting a plurality of pads within said book between said covers on said binding along one edge of each pad with said pads in side by side readable relationship, each pad comprising a plurality of leaves, so that the leaves of said pads can be turned independently of the leaves of the adjacent pads, imprinting a vowel on the leaves of a first pad having second and third pads on opposite sides of said first pad, imprinting a consonant on the leaves of the second and third pads, imprinting on each leaf a picture and name of a common object beginning with the letter corresponding to the letter on said leaf, and assembling words for viewing by the user by rotating the leaves of said pads.

2. The method of assembling and using a device for teaching the recognition and pronunciation of letters and words comprising the steps of:

assembling and mounting a plurality of pads in side by side relationship with a binding along one edge of each of said pads so that the leaves of each pad can be turned independently of adjacent pads leaving different combinations of leaves from left to right as said leaves are turned, imprinting a vowel on the leaves of a first pad having second and third pads on opposite sides of said first pad, imprinting a consonant on the leaves of the second and third pads, imprinting on each leaf a picture and name of a common object beginning with the letter corresponding to the letter on said leaf, and assembling words for viewing by the user by rotating the leaves of said pads.

* * * * *